(12) United States Patent
Reeves et al.

(10) Patent No.: US 6,850,183 B2
(45) Date of Patent: Feb. 1, 2005

(54) SLOPE MONITORING SYSTEM

(75) Inventors: Bryan Reeves, Brisbane (AU); David Noon, Brisbane (AU); Glen Stickley, Brisbane (AU); Dennis Longstaff, Brisbane (AU)

(73) Assignee: Groundprobe Pty Limited, Mawson Lakes (AU)

( * ) Notice: Subject to any disclaimer, the term of this patent is extended or adjusted under 35 U.S.C. 154(b) by 69 days.

(21) Appl. No.: 10/433,641

(22) PCT Filed: Dec. 4, 2001

(86) PCT No.: PCT/AU01/01570

§ 371 (c)(1),
(2), (4) Date: Jun. 4, 2003

(87) PCT Pub. No.: WO02/46790

PCT Pub. Date: Jun. 13, 2002

(65) Prior Publication Data

US 2004/0046690 A1 Mar. 11, 2004

(30) Foreign Application Priority Data

Dec. 4, 2000 (AU) ............................................. PR 1871

(51) Int. Cl.[7] .......................... G01S 13/89; G01S 13/88
(52) U.S. Cl. .............................. 342/22; 342/27; 342/28; 342/52; 342/53; 342/55; 342/175; 342/176; 342/179; 342/195
(58) Field of Search ................................ 324/323–344; 342/21, 22, 25 R–26 D, 27, 28, 52–59, 147, 156, 175, 176, 179, 188–197

(56) References Cited

U.S. PATENT DOCUMENTS 3,806,795 A * 4/1974 Morey ......................... 324/337
4,430,653 A * 2/1984 Coon et al. ................... 342/22
5,400,030 A * 3/1995 Duren et al. .................. 342/22
5,500,649 A * 3/1996 Mowrey et al. ............... 342/22
5,673,050 A * 9/1997 Moussally et al. ............ 342/22
5,900,833 A * 5/1999 Sunlin et al. ................. 342/22

FOREIGN PATENT DOCUMENTS

DE          19754582         6/1999

OTHER PUBLICATIONS

B.A. Reeves et al., "Deveolpments in Monitoring Mine Slope Stability using Radar Interferometry"; IEEE Publication 0–7803–6359–0/00/$10.00, pp. 2325–2327; copyrighted in the year 2000.*
D. Tarchi et al., "SAR Interferometric Techniques from Ground Based System for the Monitoring of Landslides"; IEEE Publication 0–7803–6359–0/0/$10.00, pp. 2756–2758; copyrighted in the year 2000.*
Abstract of Japanese Patent document No. 10–307921 A, published Nov. 17, 1998.
Abstract of Japanese Patent document No. 11–218574 A, published Aug. 10, 1999.
T.D. Sullivan, *Understanding Pit Slope Movements*, Geotechnical Instrumentation and Monitoring in Open Pit and Underground Mining, Szwedzick (ed) 1993, pp. 435–445.
E. Hoek and J.W. Bray, *Chapter 1: Economic and Planning Considerations*, Rock Slope Engineering, Revised Third Edition, The Institution of Mining and Metalology, London, England, 1981, pp. 323–330.
Leica brochure, *WILD DI3000S series, Long–Range Distance Measurement, Measurement without Reflectors*, Distance–Measuring Modules, 1996.

* cited by examiner

Primary Examiner—Bernarr E. Gregory
(74) Attorney, Agent, or Firm—Workman Nydegger

(57) ABSTRACT

A slope monitoring system having a radar and a video camera recording images sequences of the slope. A data processing unit performs coordinate registration to align the radar images and the video images. Interferometry is used to detect movement in the slope by generating interference maps between the images. These are suitably phase maps showing the phase change between a radar image and a reference image. An alarm occurs if a significant movement is detected.

22 Claims, 9 Drawing Sheets

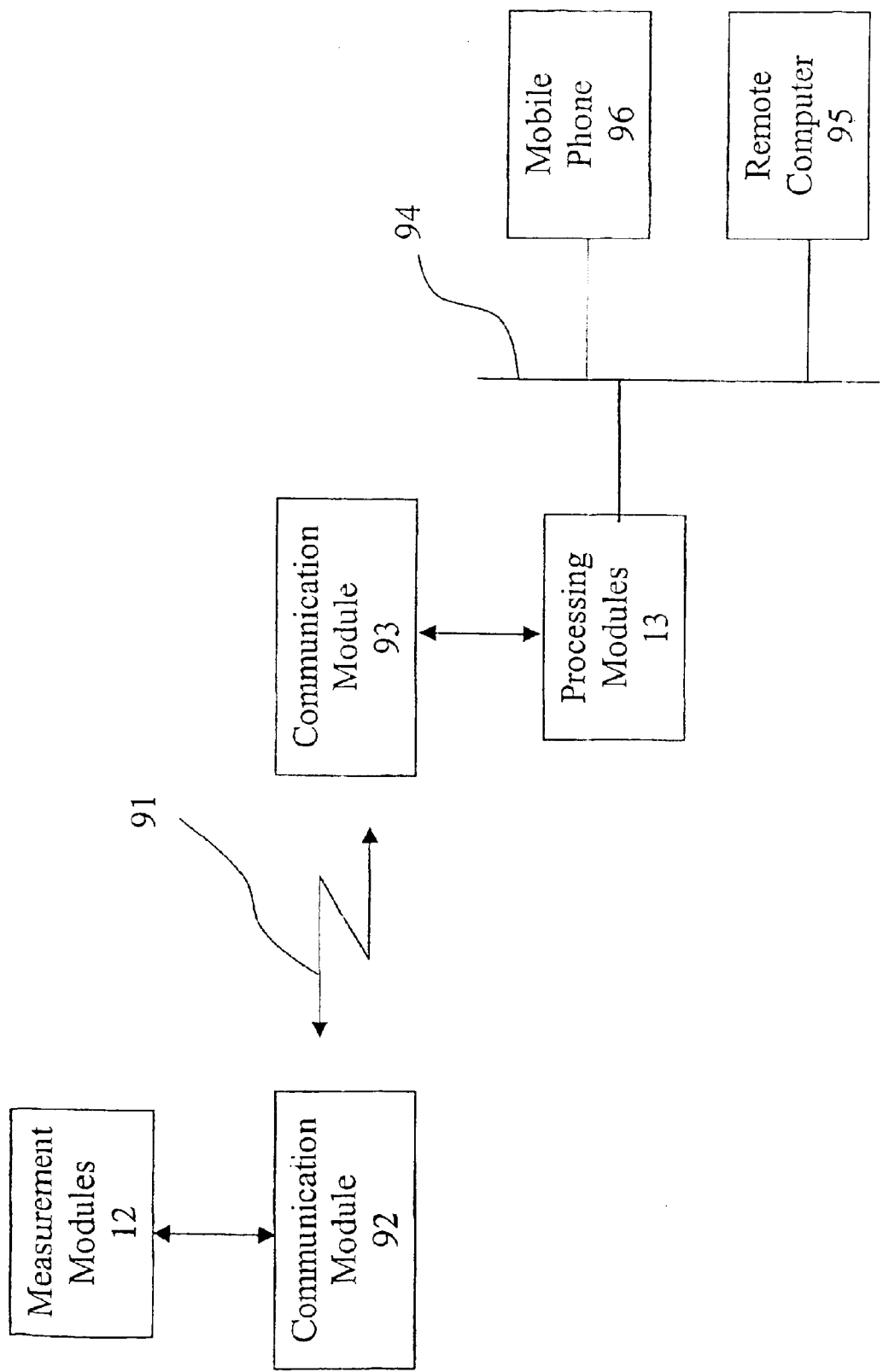

SLOPE MONITORING SYSTEM

This invention relates to a method and apparatus for monitoring slope stability, particularly in mining applications.

BACKGROUND TO THE INVENTION

Slope stability is a critical safety and production issue for coal mines. Major wall failures can occur seemingly without warning, causing loss of lives, damage to equipment and disruption to the mining process. US Mining Safety and Health Administration reports indicate that highwall fatalities account for around 10% of surface fatalities in US coal mines.

Tell-tale signs of slope instability include the opening of cracks on the wall surface and crest, audible creaking, and increased rilling of spoil. It is difficult to predict the progression of such signs to slope instability. With highwalls and in-pit benches in particular, movements may accelerate with little or no warning. Hence, mines take a conservative approach when deciding whether to expose personnel and equipment near a potentially unstable slope. Over-cautious decisions impact on the mine's productivity.

A more reliable determinant of slope instability is the measurement of outward movement and acceleration of material as an instability mechanism develops. There is strong evidence that small precursor movements of the rock wall occur for an extended period (weeks to months) prior to collapsing [E. Hoek and J. W. Bray, *Rock Slope Engineering*, The Institute of Mining and Metallurgy, 1981]. The acceleration of movement and the point of failure vary for different slope failure mechanisms. The type of failure mechanism depends on the rock mass and underlying geology. For example, wedge and plane-type failures occur where highly faulted/jointed rock masses and steeply dipping coal seams are prevalent. Another example is circular-type failures of low-wall spoil piles, where the adjacent coal recovery destabilises the pit floor below the spoil pile.

There are various monitoring systems that can measure the movement of the rock face. Geotechnical specialists can interpret the pattern and history of movement to improve prediction of the failure process, and to advise appropriate and timely stabilisation or safety management actions. Mine Managers can use such information to more reliably assess risk and maintain records for due diligence purposes. In addition, monitoring systems can sound an alarm to warn workers when the movement or acceleration of the rock face exceeds a set threshold.

Current monitoring methods at coal mines use extensometers and laser EDM (Electronic Distance Measurement) to measure the dilation of cracks appearing on the crest or face of the rock slope. These methods monitor points or lines on the wall rather than the area of the wall face, which makes interpretation of failure mechanisms very difficult [T. D. Sullivan, "Understanding pit slope movements", *Geotechnical Instrumentation and Monitoring in Open Pit and Underground Mining*, pp, 435–445, June 1993]. In addition, these methods are costly and time consuming to set up and relocate because they usually require the careful placement of sensors or reference reflectors on unstable ground that is potentially dangerous and difficult to access. Other researchers have suggested the use of reflector-less laser EDM, however currently available systems are extremely expensive to purchase, and they do not have the desired accuracy (errors of ±5 to ±10 mm when measuring to a perpendicular flat surface [Leica, WILD DI3000S Series Brochure, Leica AG, Switzerland.]). The accuracy is significantly worse for darker and rougher surfaces that are more characteristic of rock walls. The accuracy also worsens significantly for ranges greater than 50 meters.

DISCLOSURE OF THE INVENTION

In one form, although it need not be the only or indeed the broadest form, the invention resides in a slope monitoring system comprising:

a radar module that records radar images of a selected slope;
a video module that records visual images of said selected slope;
and data processing means that performs:
  coordinate registration to align said radar image and said video image; and
  interferometry to produce interference maps indicative of movement of said selected slope from said radar images and/or said video images.

In one form the data processing means is a discrete module but may alternatively be a distributed module with some functions performed in the radar module, some in the video module and some in further modules.

The interference maps may be produced between successive radar images or between an initial radar image and a later radar image. Suitably each radar image is a phase map and the interference map depicts phase change over time. Each interference map indicates displacement that has occurred between the initial phase map and a later phase map. Preferably the radar module generates the interference maps.

The data processing means may also perform additional processing including data processing algorithms for improving the quality of the radar images and video images.

The slope monitoring system may further include a failure prediction module programmed with algorithms that analyse the radar and video images to output diagnostic and predictive indicators. The failure prediction module may also generate alarms indicative of predicted slope failure.

An input device may also be provided for a user to set thresholds for use by the failure prediction module.

The algorithms programmed in the failure prediction module may draw upon models and data stored in an associated knowledge base device.

BRIEF DESCRIPTION OF THE DRAWINGS

To assist in understanding the invention, preferred embodiments will be described with reference to the following figures in which:

FIG. 9 shows a block schematic diagram of a communication system associated with the system of FIG. 1.

DETAILED DESCRIPTION OF THE DRAWINGS

Figure 1:
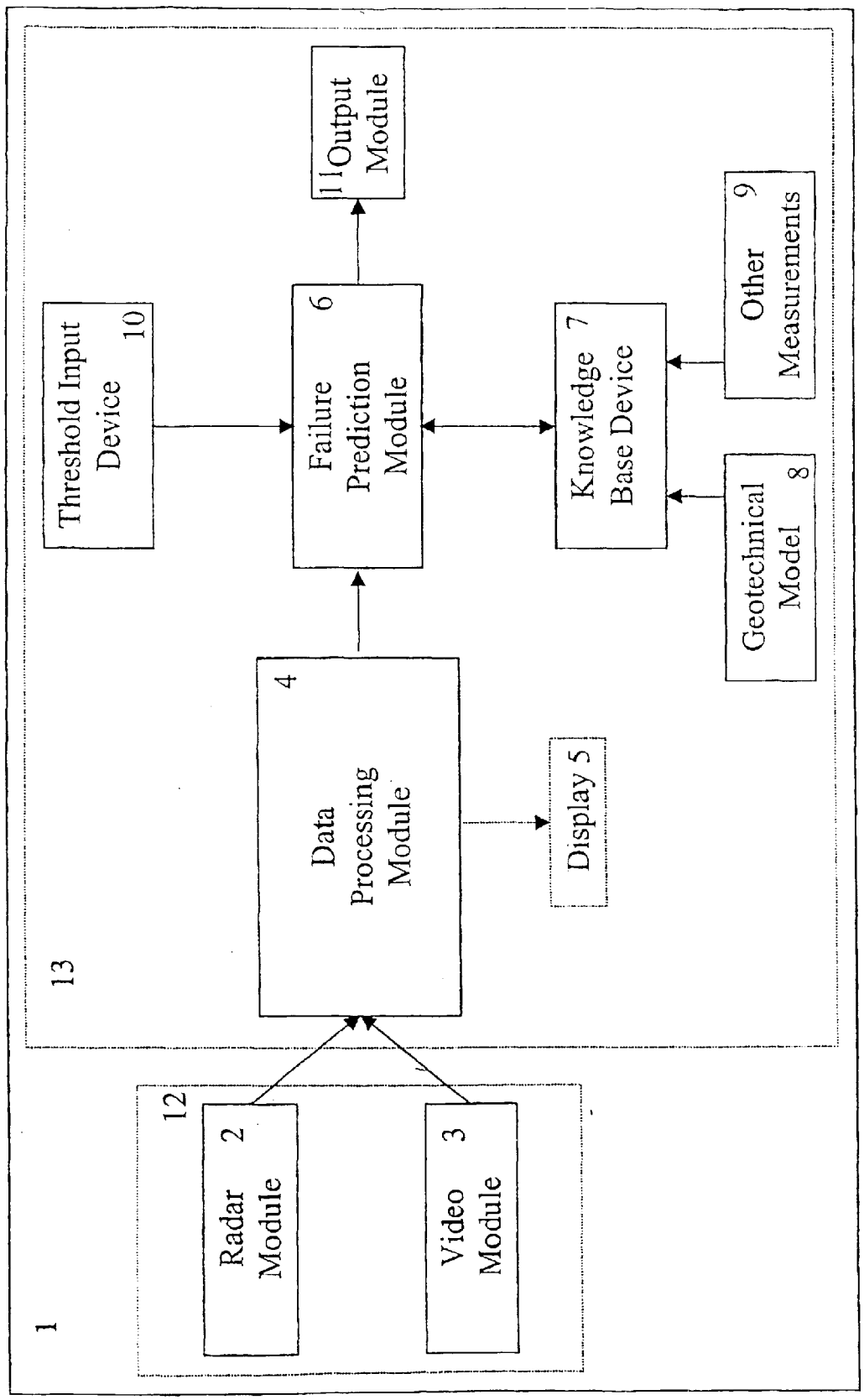
FIG. 1 shows a block schematic of a slope monitoring system incorporating a variety of optional features.

Referring to FIG. 1, there is shown a block schematic diagram of the modules of a slope monitoring system, generally indicated as 1. The system consists of a radar module 2, a video module 3 and a data processing means in the form of a discrete data processing module 4 that, amongst other functions, processes the raw data from the radar and video modules and, if required, calculates coordinate registration between the radar and video data.

The data processing module 4 provides first level processing of the radar and video data. For example, the data processing module may be programmed with algorithms for sky detection, vegetation detection, spurious signal rejection, image overlay, atmospheric correction and interferometric filtering.

An optional display 5 may be associated with the data processing module 4 for display of the results of the first level signal processing. The display 5 will show the video image and radar image of the slope being monitored, in either side-by-side or overlay format.

Signals from the data processing module 4 are passed to a failure prediction module 6. The failure prediction module 6 draws upon data and algorithms stored in a knowledge base device 7 to analyse the measured data and output a range of diagnostic and predictive indicators. The knowledge base device may simply be a storage device, such as a hard disk drive, that stores radar and video patterns that are known to be indicative of different failure modes or an active module that is able to learn by recording data and correlating the data with new observed failure modes.

The knowledge base device 7 may take input from a variety of sources such as geotechnical model 8 that provides a theoretical framework. One geotechnical model that the inventors envisage as suitable is derived from the SIROJOINT software [G. Roberts and G. Poropat, "Highwall Joint Mapping in 3-D at the Moura Mine using SIROJOINT", *Bowen Basin Symposium* 2000, pp. 343–346, October 2000]. The knowledge base device may also take input from known empirical measurements 9, such as extensometers, laser electronic distance measurement, photgrammetry, and water pressure measurements.

The failure prediction module 6 generates outputs including alarms that are triggered when detected movement patterns fall within a preset criteria. The patterns will be built up over time from recorded displacement measurements when falls have actually happened. In its simplest form this pattern may be a displacement threshold over a period of time. The threshold may be set manually by Threshold Input Device 10 or may be set automatically by the knowledge base device 7 when configured to operate in the active mode described above. The threshold input device may be a simple keyboard and/or pointing device for programming and control of the slope monitoring system.

Figure 2:
FIG. 2 is an example of an output of the system.

An output module 11 generates appropriate output according to the output from the failure prediction module 6. In one form, the output module may be a graphical user interface that displays the video image, processed radar image, legend and predictive values. An example of such a display 20 is shown in FIG. 2. The top image 21 shows a composite photographic view of the region being monitored. The bottom image 22 shows the deformations that have occurred in the rock mass. In the image there are two clear regions of movement, to the far left and at the bottom right of the region being monitored. Scales 23, 24 on the right side of the display provide a legend for the photographic image 21 and the interferometric image 22, respectively. The legend 24 for the deformation image 22 is shown in distance, being the distance that the relevant portion of the slope has moved between a reference scan and another scan (collected either earlier or later in time than the reference scan) as selected by scrollbars 29 and 30.

The output module may also generate alerts if the failure prediction module predicts a failure. At one level the alert may be in the form of a call to the mobile phone (for example) of a geotechnician who could make an assessment of the seriousness of the alert. At another level the output module may generate audible alarms in the vicinity of a predicted slope failure. A facility for multiple users may be included to allow the mine safety officer to set trigger points for multiple alarms without interfering with the alarm settings made by the geotechnician. The output module may be configured to shutdown or move equipment if the failure prediction module indicates an imminent slope failure. The display 20 of FIG. 2 shows 25 that an alarm is enabled. When slope movements trigger the alarm, the video display highlights the region of the slope that caused the alarm so that the user can pinpoint the unstable region.

It is convenient to consider the slope monitoring system 1 as the combination of measurement modules 12 and processing modules 13. The measurement modules are described in greater detail below. The processing modules are suitable known computer systems programmed with data processing algorithms. It will be appreciated that the processing modules may be embodied in a single computer or, may be embodied in multiple computers each performing a specific task.

Figure 3:
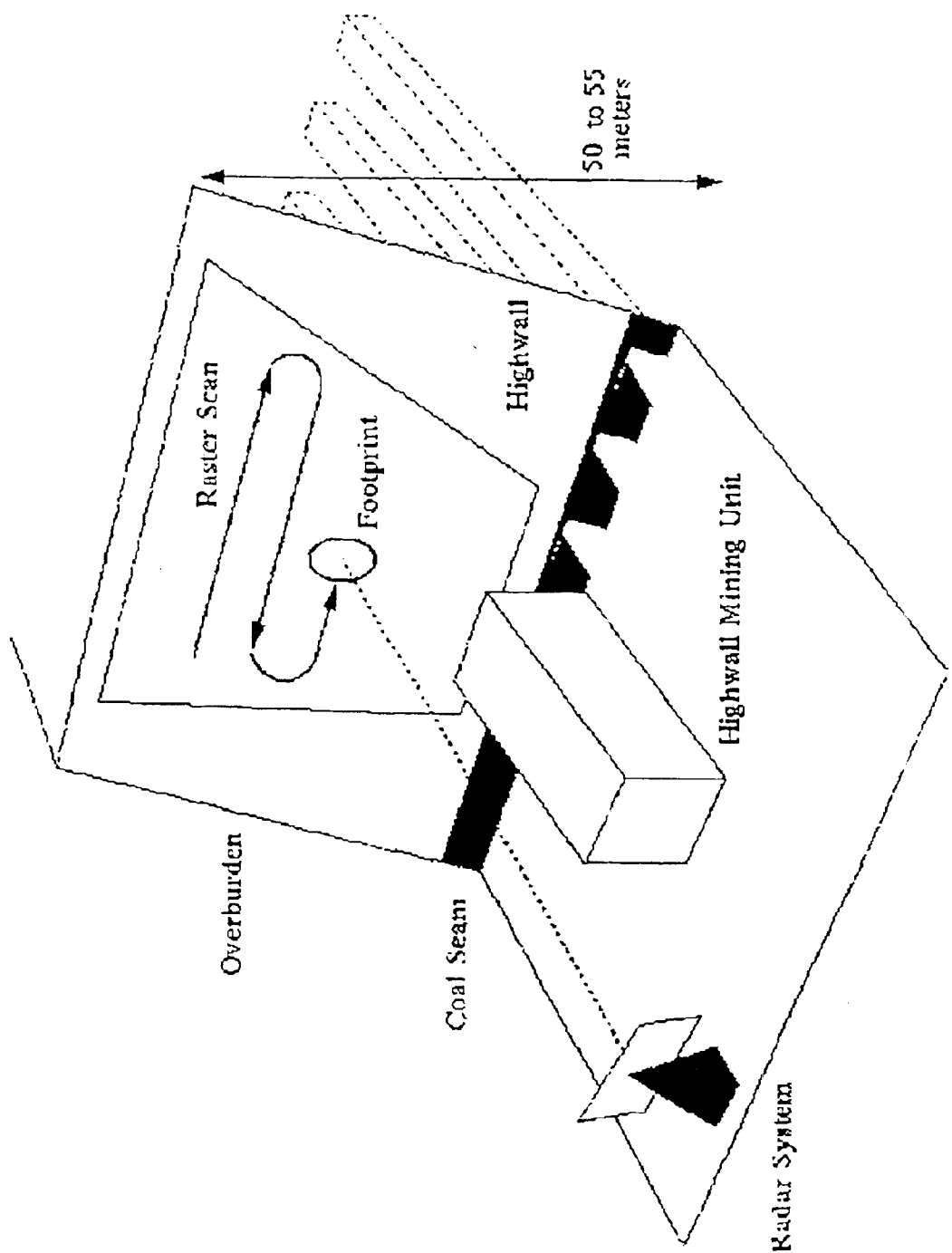
FIG. 3 shows the slope monitoring system of FIG. 1 in a highwall mining application.
Figure 4:
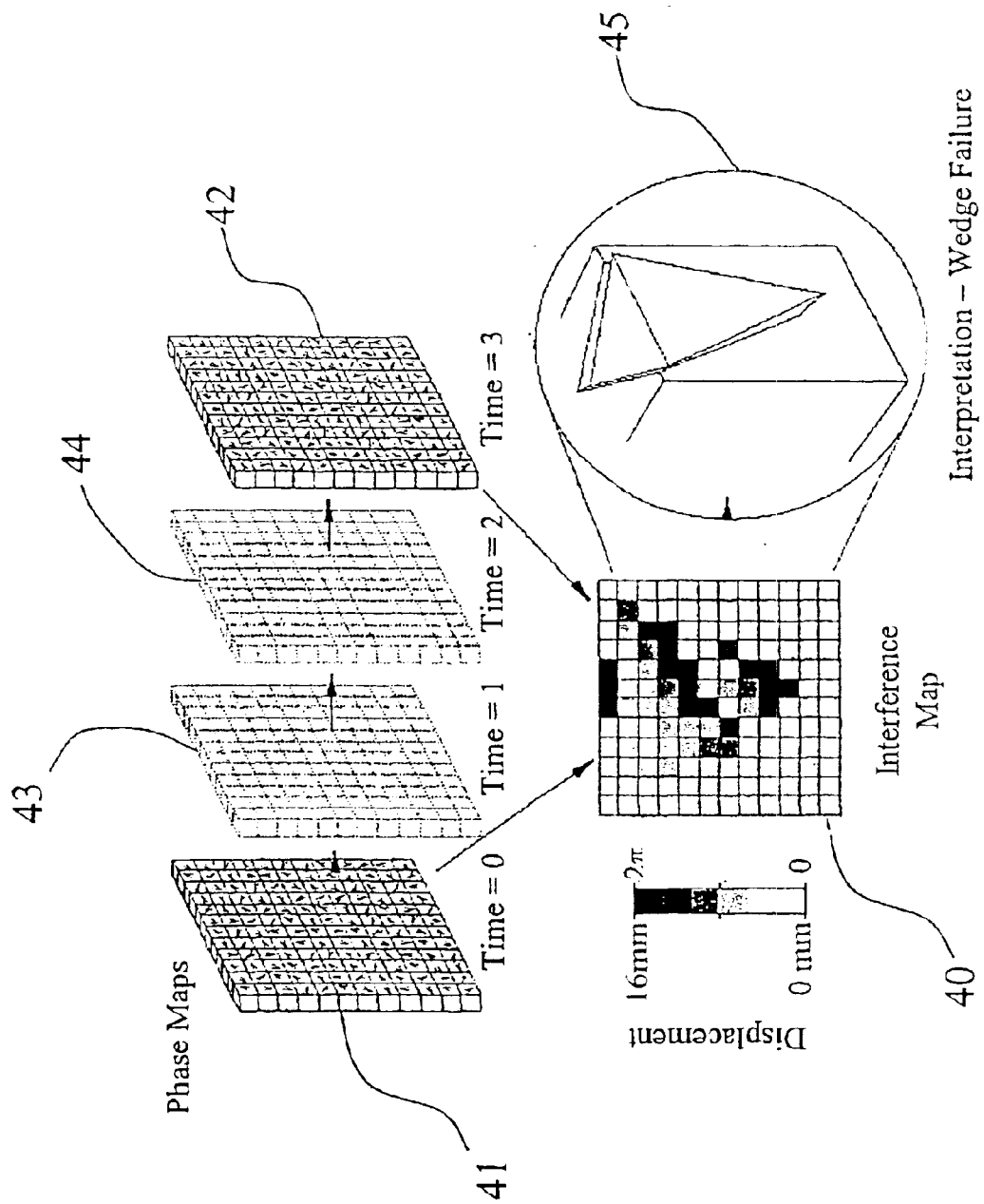
FIG. 4 shows the formation of an interference map by the radar module of FIG. 3.

A sketch of the radar configuration is shown in FIG. 3 for a highwall mining embodiment. For this application the radar module 2 is placed on the pit floor at a safe distance back from the foot of the wall. For the highwall mining application, this would be around 30–50 meters back from a 50 meter highwall. The radar scans a region of the wall and detects the range cells containing the reflection from the wall. The radar then measures the amplitude and phase of this part of the reflected signal relative to the transmitter signal. This forms the radar image which in turn gives a phase map. The next stage is to compare the phase measurements in each pixel of the most recent phase image with the original phase image. This generates the phase interference map. This is a measure of the displacement of the rock surface towards the radar. This measure can be converted into linear units using the formula distance equals radar wavelength multiplied by the phase change in degrees divided by 180 degrees. This allows the phase interference map to be converted to a displacement map. The process is depicted in FIG. 4. The advantage of this radar over other slope monitoring techniques is it can provide full area coverage of a rock slope without the need for reflectors mounted on the rock face. The radar waves penetrate through rain, dust and smoke to give reliable measurements, although reduced accuracy is expected in pixels where there is vegetation on the slope.

As seen in FIG. 4, the radar module 2 produces an interference map based on the phase change between scans over time. In FIG. 4 the interference map 40 is produced from the interference between the initial phase map 41 and a later phase map 42, taken at time=3. The inventors have found that it is preferable to construct the interference map 40 from consecutive phase maps such as map 43 at time=1 and map 44 at time=2.

In the example of FIG. 4, the interference map 40 is interpreted as a wedge-shaped failure shown schematically in the inset 45.

The raw displacement data, in the form of the interference map, is sent to the data processing module 4 for further processing. In an alternate form of the invention the initial phase map may be stored in the data processing module with subsequent phase maps being transmitted from the radar module to the data processing module for processing. The inventors have found that it is convenient for the radar module to do sufficient pre-processing to produce the interference (displacement) map.

In one embodiment, the scanning antenna of the radar consists of a 0.92 m diameter parabolic dish mounted on a sturdy tripod and controlled by separate motors and gears for azimuth and elevation movement. The mechanical pointing accuracy and tripod stability requirements were designed to be within the system accuracy specification. A computer in a radar electronics box can position the parabolic dish to anywhere between −15° and 165° in elevation from the horizontal, and between −170° and 170° in azimuth. The 2D scan region may be set manually or automatically for the application. The scan speed is approximately 25 minutes for 4000 pixels on the wall. The pixel size on the wall is determined by the range extent of a 1° beam divergence. For a rock slope at 100 meters range, the pixel size on the wall will be approximately 2 m×2 m. The radar source operates at 9.4 GHz frequency and has a signal bandwidth of 200 MHz. The range resolution is 0.75 m and angular resolution is 2°. In its current form, the radar can operate at ranges between 30 and 500 meters. Increased range is possible by using a beam with increased angular resolution.

The video module 3 is suitably a high-resolution CCD camera that captures a visible image of the scan area of the radar. In the preferred embodiment the camera is boresighted to the center of the field of scan of the radar. The camera takes several images of the entire scan field and composites them to produce a single view of the entire scan field. Alternatively, the camera may be configured to have the same field of view as the radar and to scan with the radar. These video images provide a visual history of any changes in the slope caused by weathering, opening cracks or fallen rocks. The visual history may be stored in the knowledge base 7 and used as an input to the failure prediction module 6.

The data processing module 4 removes artifacts such as sky, vegetation and spurious signals, and performs atmospheric correction and interferometric filtering. The sky produces very low amplitude reflections and incoherent phase in the image. Sky pixels can be detected and blanked out by thresholding the amplitude values in the image. Vegetation on the slope produces high amplitude reflections and incoherent phase in the image. Vegetation pixels can be detected and blanked out by determining the pixels that have high amplitudes, and incoherent phases between successive images. Spurious signals from targets other than the slope also have high amplitude reflections, and low phase coherence in the image. Spurious signal can be rejected by determining the pixels that have high amplitudes, and sudden changes in phase coherence between successive images.

Atmospheric variations in humidity, temperature and pressure cause the appearance of false movements of the wall in the interferometric image. To correct for atmospheric variations between scans, the user selects a small region of pixels in the interferometric image that is known to be a stable section of the slope, or contains a calibration target. Atmospheric variations can also be corrected using direct ambient measurements of humidity, temperature and pressure. The data processing module adjusts the interferometric phases of all pixels in the image by an amount to cause the selected region of pixels to be stable. Interferometric noise can occur in pixels on the slope that have weak amplitudes, caused by rain and other slight disturbances to the slope surface. An interferometric filter can be applied to spatially combine the amplitudes and phases of pixels and produce a better estimate of the interferometric phase of the affected region.

Figure 5:
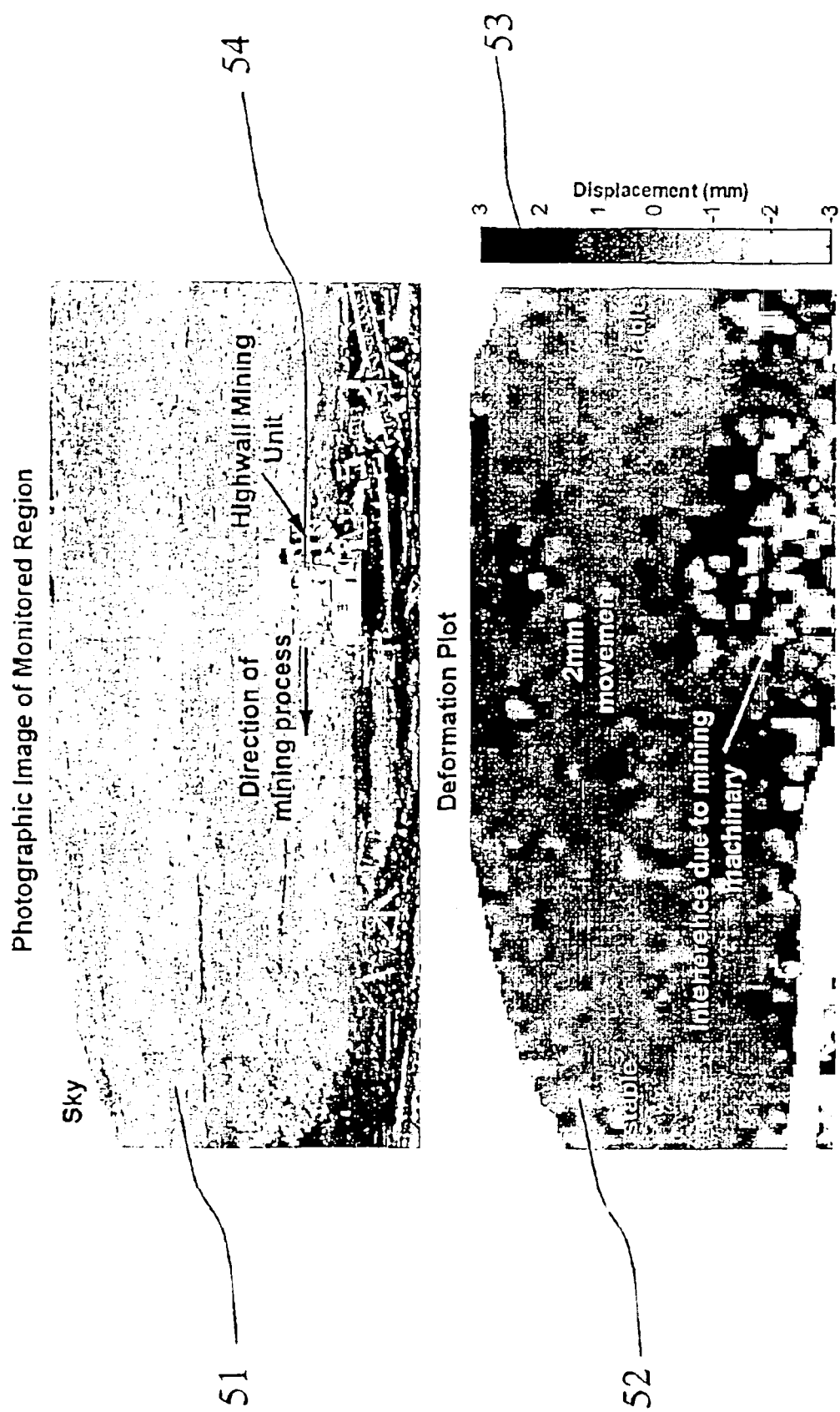
FIG. 5 shows a typical display of radar image and video image.

The processed images from the data processing module 4 may be displayed locally on the optional display 5. A sample display is shown in FIG. 5. FIG. 5 shows a photographic image 51 of a monitored region above an interference map 52 of the same region. A legend 53 showing the displacement is also provided. The images are normally provided in colour to make interpretation easier than in grey scale. As can be seen by a comparison between FIG. 5 and FIG. 2, the local display 5 may provide a more rudimentary display than the output module 11.

It can be noted in FIG. 4 that the radar image 52 includes interferences due to movement of the mining machinery 54 visible in the photographic image. These artifacts may be removed in the data processing module.

Figure 6:
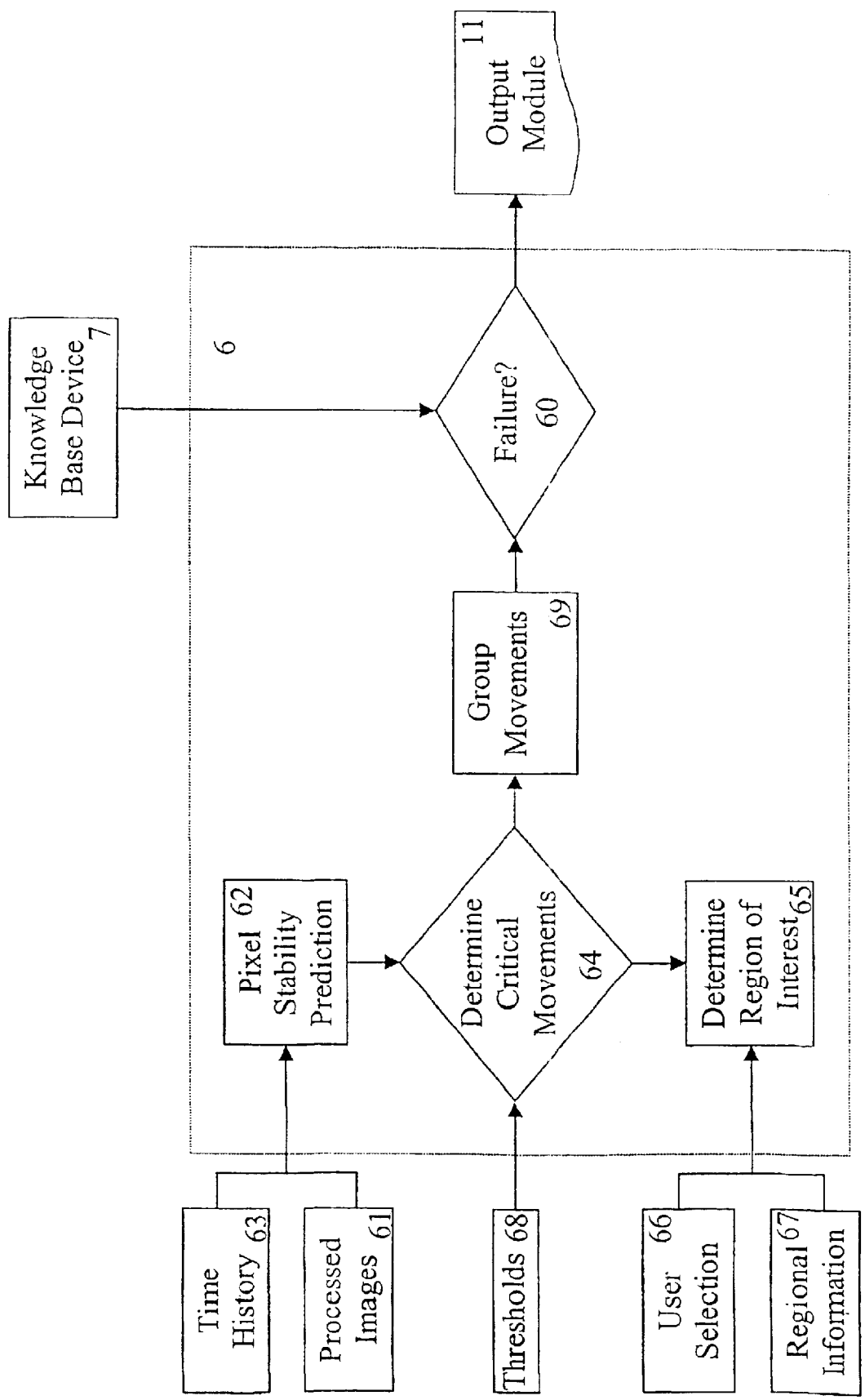
FIG. 6 is a flow chart of the operation of the failure prediction module.

The failure prediction module 6 analyses the data obtained from the data processing module 4. FIG. 6 is a flow chart of the operation of the failure prediction module. The module 6 can be replicated to support several users.

In the simplest form, most of the steps of FIG. 6 may be performed by a skilled user with the failure prediction module producing a time sequence of the video images and radar images in the easy to view, graphical user interface of FIG. 2. The display is suitably produced in Java on a server that is accessible from anywhere in the world. An appropriately qualified geotechnician can then access the display via the Internet to analyse the stability of the monitored slope. The display may also include the result of one or more of the diagnostic algorithms described above. This simple approach requires a skilled user, such as a geotechnician, to constantly monitor the output from the slope monitoring system. The system has the advantage that the skilled user need not be located at or near the monitored slope.

It is not cost effective for a geotechnician to continuously view the data being collected. Therefore, the failure prediction module incorporates failure prediction algorithms that automatically generate alarms to a level set by the user. Likewise the Mine Manager and Mine Safety Officer may also need access with different failure prediction settings. This facility is provided by allowing different users the facility to make their own settings.

Looking at FIG. 6 in detail, the processed images 61 from the data processing module 4 are passed as inputs to pixel stability prediction algorithms 62. A recorded time history of movements in each pixel 63 may also be used as input to the pixel stability prediction algorithms. The result from these algorithms, being pixel by pixel stability data, is input to an algorithm to determine critical movements 64.

The region of interest 65 is also input to the critical movement determination. The region of interest 65 is determined from a combination of a selection made by the user 66, usually during set up of the slope monitoring system, and regional information 67 which may be obtained from the knowledge base device 7.

The third input to the critical movement determination is a threshold 68 set by the user with the threshold input device 10. Critical movements which are above the user defined threshold can then be determined. These are then grouped 69 to determine the area of the movement.

The failure algorithms draw upon data from the knowledge base device 7, which may include geotechnical models 8 and other measurements 9, as shown in FIG. 1. Improved reliability can be achieved by combining the processed radar and video data with measurements from other sensors such as extensometers, laser EDM and water pressure monitors.

The combination of area and magnitude of movement or any of its time derivatives can be used to trigger an alarm as determined by the failure algorithms 60. A simple movement distance threshold is not adequate for good alarm generation. One preferred threshold is a maximum allowable movement over a minimum region. Such a threshold avoids alarms due to small localised movements, while still allowing the system to be sensitive to small movements if they occur over a larger area. It is also preferable to be able to set several different thresholds that may trigger different alarms to alert different people. For example, fine movements could alert the geotechnical specialist to examine the seriousness of the wall movement, while coarse movements could alert the mine workers to immediately pull away from the slope.

Figure 7:
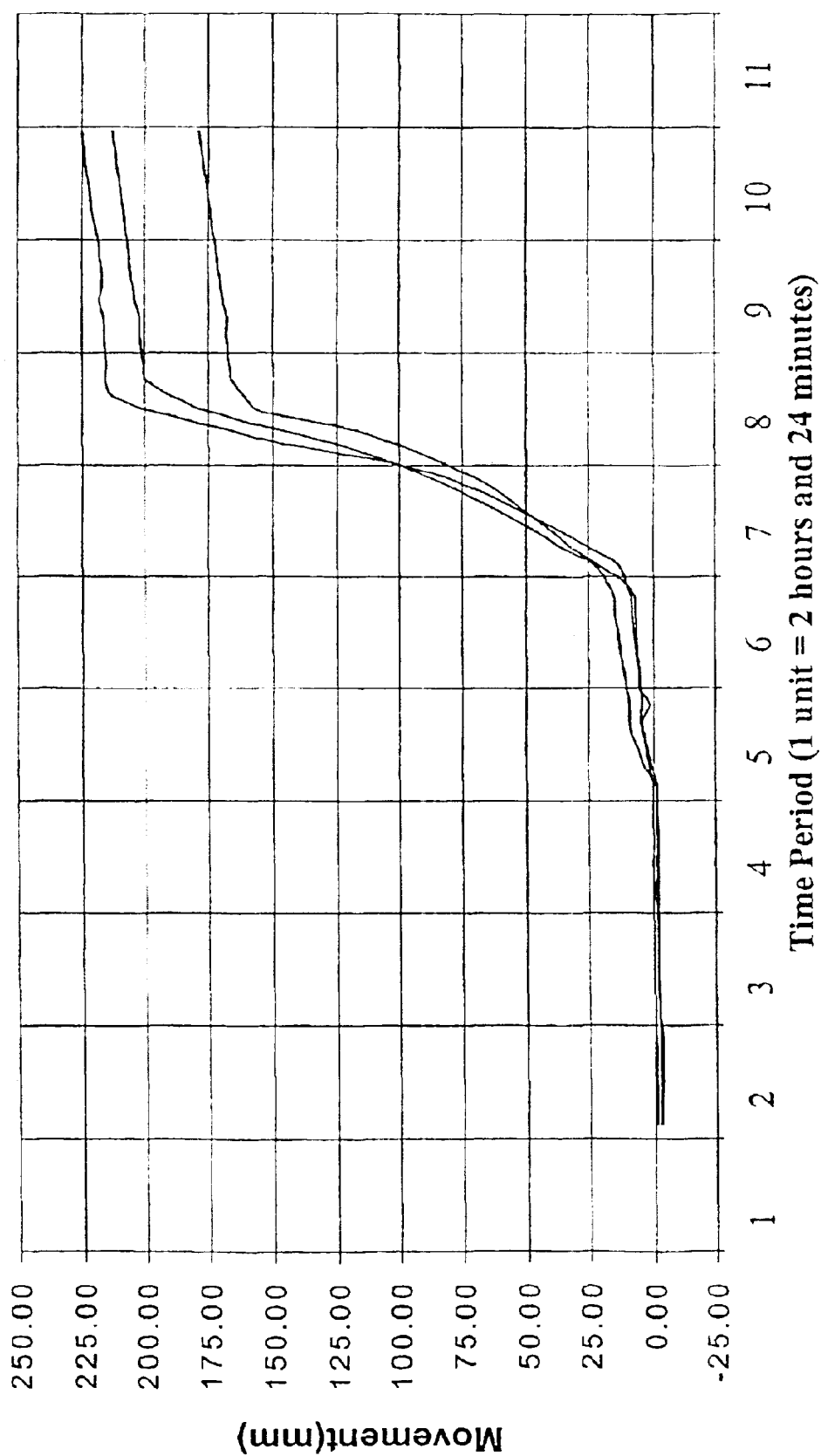
FIG. 7 is a chart showing slope movement.
Figure 8:
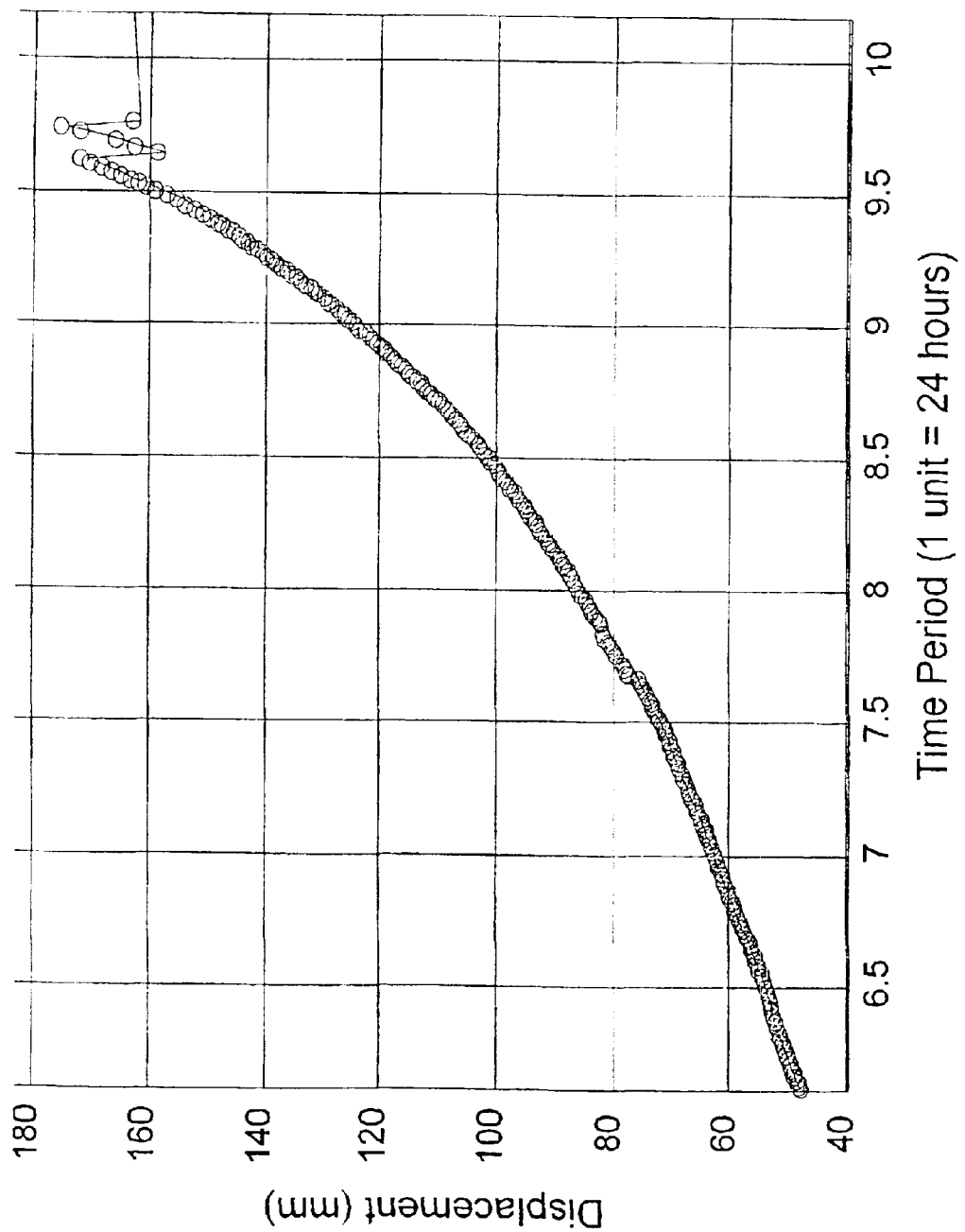
FIG. 8 is another chart showing slope movement.

The nature of slope movement can also be analysed to generate an alarm. FIG. 7 shows the movement over time of three sections of the rock face shown as 26, 27 and 28 in FIG. 2. Each time division is 2 hours 24 minutes so that there are five divisions in a twelve hour period. A series of small movements (approximately 20 mm) occurred in periods 5 and 6 prior to large and rapid movements (approximately 200 mm) in periods 7 and 8. Such behavior is indicative of instability in the slope. Sections of the slope actual failed during period 8 and caused the movements to reduce to a more gradual linear behavior during periods 9 and 10. Another indicator of slope instability is acceleration of the wall, as shown in FIG. 8. In FIG. 8, each time period is twelve hours. The rate of change of displacement over time increased gradually over a three day period until failure occurred on the tenth day. Alarms may be set for either displacement, rate of movement, acceleration or changes in wall acceleration. Measured data may be compared to data stored in the knowledge base in determining alarm settings.

It will be noted that the wall movement measured by the system becomes ambiguous at a displacement of around 16 mm. This is due to phase ambiguity in the radar signals that will occur if the displacement is greater than the one half wavelength of the radar frequency. In other words, phase ambiguity occurs if $$n\frac{\lambda}{2} < s < -n\frac{\lambda}{2}$$

where s is displacement, n is an integer and $\lambda$ is the wavelength of the radar. The phase ambiguity can be resolved by using curve fitting techniques to predict future points from past data and thereby solve for n. The ambiguity can also be resolved by determining the range from the use of the bandwidth of the radar. For each pixel, the radar range can be determined from the previous scan and compared with the current scan to calculate n. However, the preferred method of resolving phase ambiguity is to use spatial phase unwrapping by considering many pixels on the wall. Some pixels will have moved by a smaller amount and hence not suffered a phase ambiguity. Starting from these and assuming the deformation is a continuous function of pixel location it is possible to calculate n of an adjacent pixel and continue this process iteratively until n is calculated for all pixels.

The ambiguity can also be resolved by determining range from the delay time of the envelope of the radar echo. This is less accurate than using phase, but can be sufficiently accurate to resolve the ambiguity if the signal to noise ratio is strong.

It will be appreciated that in many applications the slope monitoring system must be ruggedised to survive in a mining environment. FIG. 9 depicts a communication system that facilitates separation of the measurement modules 12 from the processing modules 13. A communication module 92 associated with the measurement modules 12 communicates by wire or wireless link 91 to communication module 93 associated with the processing modules 13. The processing units 13 may then transmit information via a network 94 (WAN, LAN, Internet) to a remote computer 95, mobile phone 96 or other device.

It will be appreciated that the slope monitoring system provides continuous remote monitoring of a slope with integration of visual and radar information to provide reliable indications of slope stability. The system also provides prediction of slope failure and generates suitable alarms from the prediction algorithms.

Throughout the specification the aim has been to describe embodiments of the invention without limiting the invention to any specific combination of alternate features.

What is claimed is:

1. A slope monitoring system comprising:
    a radar module that records radar images of a selected slope;
    a video module that records visual images of said selected slope; and data processing means that performs:
    coordinate registration to align said radar images and said video images; and
    interferometry to produce interference maps indicative of movement over time of said selected slope from said radar images and/or said video images.

2. The slope monitoring system of claim 1 wherein the data processing means is a discrete data processing module.

3. The slope monitoring system of claim 1 wherein the data processing means is a distributed module with functions performed in one or more of the radar module, the video module, or further modules.

4. The slope monitoring system of claim 1 wherein the interference maps are produced between successive radar images.

5. The slope monitoring system of claim 1 wherein the interference maps are produced between an initial radar image and a later radar image.

6. The slope monitoring system of claim 1 wherein each radar image is a phase map and the interference map depicts phase change over time.

7. The slope monitoring system of claim 6 wherein each interference map indicates displacement that has occurred between an initial phase map and a later phase map.

8. The slope monitoring system of claim 1 wherein the interference maps are produced in the radar module.

9. The slope monitoring system of claim 1 wherein the data processing means performs additional processing including data processing algorithms for improving the quality of the radar images and video images.

10. The slope monitoring system of claim 9 wherein the additional processing includes algorithms for performing one or more of: sky detection; vegetation detection; spurious signal rejection; image overlay; atmospheric correction; and interferometric filtering.

11. The slope monitoring system of claim 1 further comprising display means associated with the data processing means.

12. The slope monitoring system of claim 1 further comprising a failure prediction module programmed with algorithms that analyse the radar images and video images to output diagnostic and predictive indicators.

13. The slope monitoring system of claim 12 wherein the failure prediction module generates alarms indicative of predicted slope failure.

14. The slope monitoring system of claim 12 further comprising an input device for a user to set thresholds for use by the failure prediction module.

15. The slope monitoring system of claim 12 wherein the algorithms programmed in the failure prediction module utilize models and data stored in an associated knowledge base device.

16. The slope monitoring system of claim 1 further comprising a failure prediction module utilizing models and data stored in an associated knowledge base device and having as input data from one or more of: extensometers; laser electronic distance measurements; photgrammetry; water pressure measurements; and historical video images.

17. The slope monitoring system of claim 12 wherein the failure prediction module is programmed with pixel stability algorithms.

18. The slope monitoring system of claim 12 wherein the failure prediction module determines critical movements in the selected slope by analysing pixel by pixel stability data determined by pixel stability algorithms.

19. The slope monitoring system of claim 1 further comprising communication means providing remote communication between said radar module, said video module and said data processing means.

20. A method of identifying a region of a slope prone to failure including the steps of:
   recording a video image of the slope;
   recording a first radar image of the slope at a first time;
   recording a second radar image of the slope at a second time;
   calculating an interference map from the first radar image and the second radar image;
   performing coordinate registration between the interference map and the video image;
   analysing the interference map to identify regions prone to failure; and
   using the coordinate registration to identify the region on the slope.

21. The method of claim 20 further including the steps of generating an alarm to indicate impending failure of the slope.

22. The method of claim 21 wherein the step of generating an alarm includes the steps of:
   determining critical movements of the slope;
   comparing the critical movements to a knowledge base of critical movements; and
   generating an alarm if the critical movement is indicative of failure according to the knowledge base.

* * * * *

UNITED STATES PATENT AND TRADEMARK OFFICE
CERTIFICATE OF CORRECTION

PATENT NO.     : 6,850,183 B2
DATED          : February 1, 2005
INVENTOR(S)    : Bryan Reeves et al.

It is certified that error appears in the above-identified patent and that said Letters Patent is hereby corrected as shown below:

<u>Title page,</u>
Item [57] ABSTRACT,
Line 2, change "images" to -- image --

<u>Column 6,</u>
Line 16, change "FIG. 4" to -- FIG. 5 --

<u>Column 7,</u>
Line 25, change "actual" to -- actually --

Signed and Sealed this

Fourteenth Day of June, 2005

JON W. DUDAS
*Director of the United States Patent and Trademark Office*